United States Patent [19]

Feuvrier

[11] Patent Number: 5,039,064
[45] Date of Patent: Aug. 13, 1991

[54] HANDLING DEVICE FOR LAYING ELECTRICAL CABLES BY HELICOPTER

[75] Inventor: Louis Feuvrier, Nozieres, France

[73] Assignee: Electricite De France, Paris, France

[21] Appl. No.: 577,482

[22] Filed: Sep. 5, 1990

[30] Foreign Application Priority Data

Sep. 5, 1989 [FR] France .................................. 89 11572

[51] Int. Cl.⁵ .............................................. B66D 1/36
[52] U.S. Cl. .......................................... 254/134.3 R
[58] Field of Search ................. 254/134.3 R, 134.3 PA

[56] References Cited

U.S. PATENT DOCUMENTS 4,421,301 12/1983 Chapman ..................... 254/134.3 R Primary Examiner—Robert C. Watson
Attorney, Agent, or Firm—Blakely, Sokoloff, Taylor & Zafman

[57] ABSTRACT

This device (100), making it possible to pass a cable through a passage in a supporting structure delimited by a closed contour, comprises:

a frame (110) suspended under the helicopter and having means (112-117) for centering and supporting the device on the supporting structure, supported by this frame, two aligned straight guides (124, 124') located at a distance from one another on either side of the supporting structure and oriented in such a way that their common axis passes through the passage of this supporting structure, a slide (130) movable in translational motion through the straight guides, of a length greater than the gap between these and equipped with means (132) for fastening the end of the cable to it, drive means (125, 125') for moving the slide completely from one guide (124) to the other (124') and retrieving it in this other guide, at the same time carrying the wire across the gap between the guides so as to cause it to pass through the passage.

1 Claim, 3 Drawing Sheets

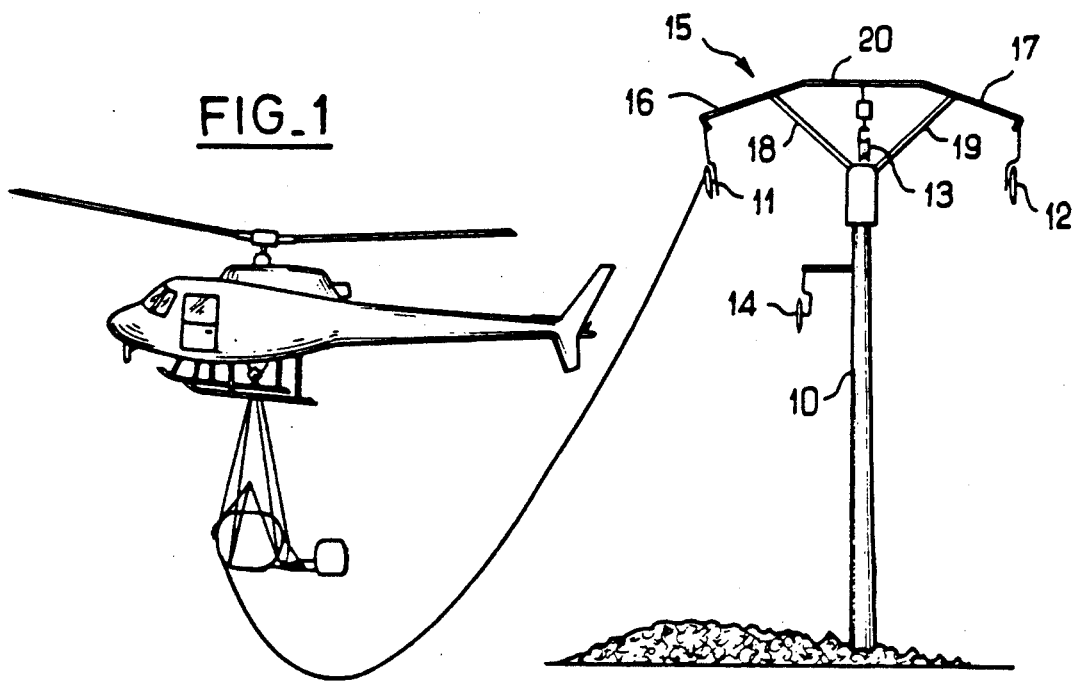
FIG_1
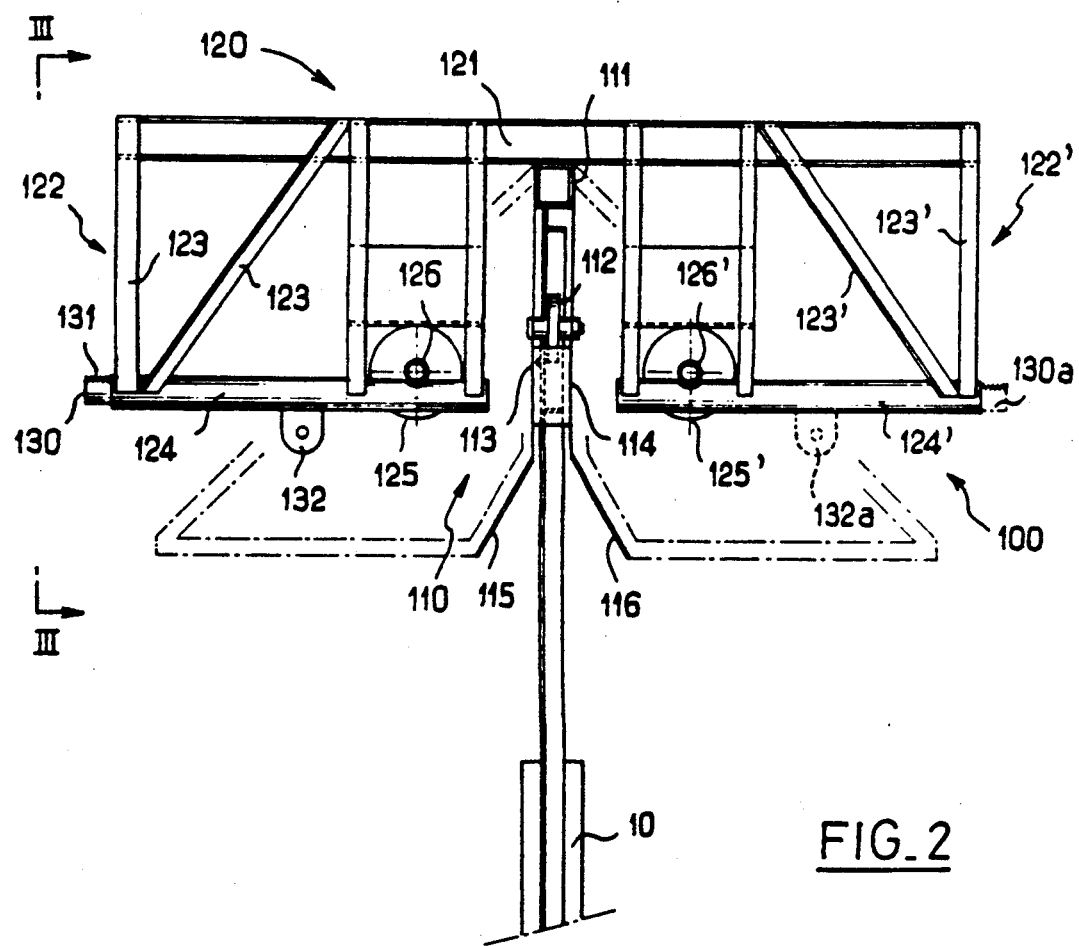
FIG_2

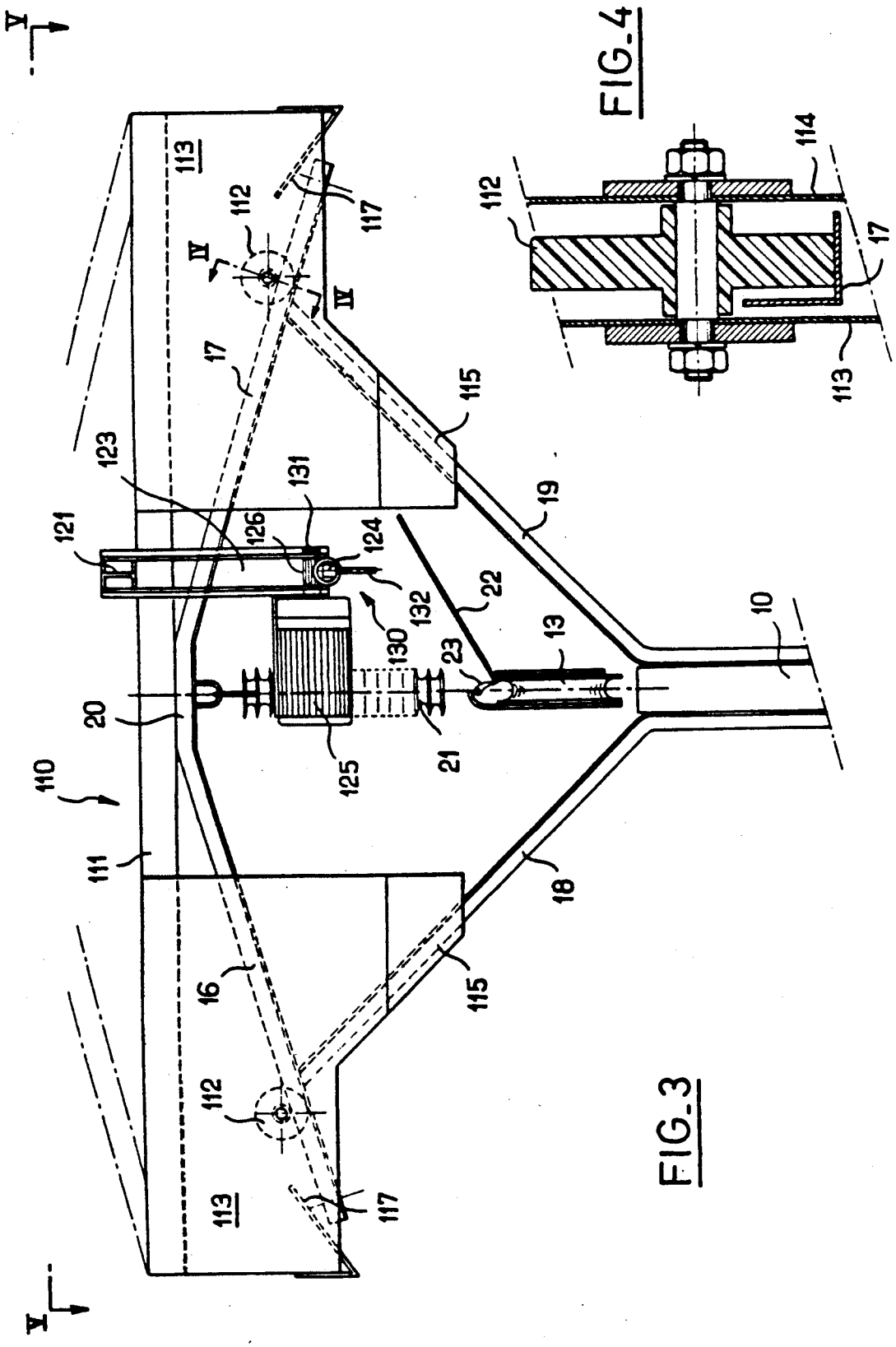

HANDLING DEVICE FOR LAYING ELECTRICAL CABLES BY HELICOPTER

BACKGROUND OF THE INVENTION

The present invention relates to a handling device for laying electrical cables by helicopter.

This method of laying electrical cables, although especially effective and quick, at the present time entails a problem of unwinding the cables through passages in supporting structures which are delimited by a closed contour.

FIG. 1 illustrates a typical example of this problem.

The pylon consists of a mast 10 supporting the pulleys 11, 12, 13, 14 holding the electrical cables. In the example illustrated, the pulleys 11 to 13 corresponding to the three phases are suspended on a supporting structure 15 formed from two arms 16, 17, to the end of which the pulleys 11 and 12 are attached, these arms being braced by oblique beams 18 and 19 joined at their top by a horizontal transverse beam 20.

As can be seen from this illustration, it will be easy to deposit the cables on the pulleys 11, 12 and 14 by helicopter, but the placing of the central phase will come up against the problem that, to deposit the cable on the central pulley 13, it has to be passed through the closed contour delimited by the beams 18, 19 and 20.

For this purpose, for this central phase the unwinding has to be carried out on the outside of the supporting structure, and then this is partially disassembled in order to introduce the cable manually into the passage and deposit it on the pulley 13.

This manipulation, in addition to the safety problems which it involves, considerably slows the rate of laying cables by helicopter, since manual intervention will be necessary at each pylon.

SUMMARY OF THE INVENTION

The object of the invention is to overcome this difficulty by providing a handling device making it possible to pass a cable through a passage in a supporting structure delimited by a closed contour.

The invention is employed, in general terms, whenever this problem is encountered, the instance illustrated in FIG. 1 being given only as an example.

Moreover, passages delimited by a closed contour (such as the passage delimited by the beams 18, 19 and 20 of FIG. 1) will be taken to include passages which, although not being completely closed, have an aperture located in such a place that it is not possible to pass the cable directly through it from the helicopter.

The object of the device of the invention is to make it possible to pass the cable through the closed contour automatically and without human intervention. As will be seen, the device is manipulated and controlled from the cabin of the helicopter.

More specifically, to make it possible to pass a cable through a passage in a supporting structure delimited by a closed contour, the device of the invention comprises:
a frame capable of being suspended under the helicopter and having means for centering and supporting the device on the supporting structure,
supported by this frame, two aligned straight guides located at a distance from one another on either side of the supporting structure and oriented in such a way that their common axis passes through the passage of the supporting structure,
a slide movable in translational motion through the straight guides, of a length greater than the gap between these and equipped with means for fastening the end of the cable to it,
drive means for moving the slide completely from one guide to the other and retrieving it in this other guide, at the same time carrying the wire across the gap between the guides so as to cause it to pass through the passage.

A detailed description of an example of the device will now be given with reference to the accompanying drawings.

BRIEF DESCRIPTION OF THE DRAWINGS

FIG. 1 shows a general view of a supporting structure for an electrical line.

FIG. 2 is a side elevation view, according to II—II of FIG. 5, of the handling device of the invention placed on a supporting structure.

FIG. 3 is an end elevation view of this device according to III—III of FIG 2.

FIG. 4 is a sectional view of the detail designated by IV—IV in FIG. 3.

DETAILED DESCRIPTION

Figure 5:
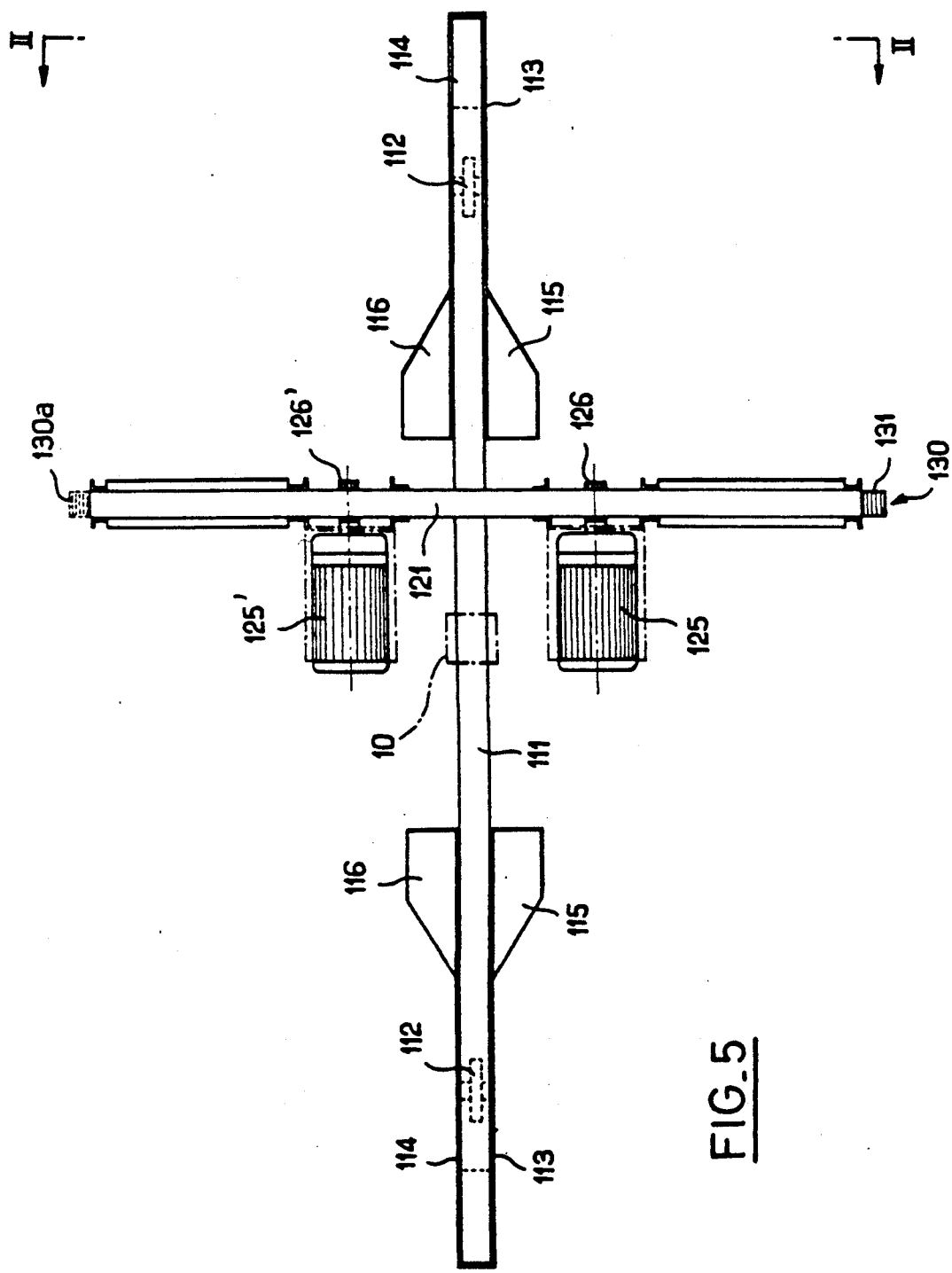
FIG. 5 is a top view of the device of the invention, taken according to V—V of FIG. 3.

The handling device 100 of the invention is illustrated in FIGS. 2, 3 and 5.

It comprises essentially a frame 110 enabling it to be positioned on the supporting structure described above in relation to FIG. 1 (or on any other comparable supporting structure), and a system 120 making it possible to guide and move a slide 130, to which the cable (not shown) to be installed will be attached.

The frame 110 comprises essentially (see especially FIG. 3) a beam 111 taking its place on the horizontal crossmember 20 of the supporting structure and carrying, at each of its ends, a pair of flanges 113, 114 which will cover the lateral arms 16 and 17 of the supporting structure.

To support and center this frame on the supporting structure, there are carrier rollers 112 (shown in more detail, in section, in FIG. 4) which rest on the L of the angle piece forming each of the lateral arms 16, 17 and thus ensure the correct centering of the frame on the supporting structure. When the frame is centered perfectly on the supporting structure, the crossmember 111 comes to rest on the horizontal upper beam 20 of the supporting structure.

To make it easier to position this frame, which is suspended under the helicopter, the lateral flanges are widened at 115, 116, to allow the plane of the frame to coincide with that of the supporting structure, and there are end guide plates 117, 117 to allow transverse centering.

The frame 110 supports not only the centering and supporting means just described, but also a structure 120 (shown more particularly in FIG. 2) which consists of transverse supports 122 and 122', symmetrical and located on either side of the supporting structure. These assemblies 122, 122', are suspended from a longitudinal member 121 perpendicular to the crossmember 110 of the frame and consist of a particular number of sections 123, 123', serving for supporting the guides 124, 124', and drive motors 125, 125'.

These electric motors 125, 125', are electric servomotors, the energy for which is supplied by the generator of the helicopter.

Of course, the various structural elements of the frame 110 and of the assemblies 120 and 120' are produced from a light metal alloy, so that the device can easily be transported and manipulated by the helicopter.

The guides 124, 124' are formed from two aligned tubes positioned in such a way that their common axis passes through the passage of the supporting structure delimited by the closed contour 18, 19, 20 (see especially FIG. 3).

These guide tubes have a longitudinal slot in the lower part from end to end and receive a slide 130 equipped in the upper part with a rack 131 and in the lower part with a cable attachment ring 132 projecting from the guide tube through the lower slot of the latter.

It can be seen that, with this configuration, it is possible to move the slide 130 from one guide tube towards the other in translational motion, at the same time causing the attachment ring and therefore the cable attached to it to pass through the closed contour 18, 19, 20.

The translational movement of the slide is obtained by means of the two servomotors 125, 125', the shafts of which are equipped with pinions 126, 126' coming into engagement with the rack 131 of the slide.

If a slide is provided whose rack has a length at least equal to the center distance of the two motors 126, 126', it can be seen that, with the slide initially being placed in one of the guides (for example, the guide 124, as illustrated in FIGS. 2 and 5 where the slide has been represented by unbroken lines), it is possible to advance the slide in the direction of the other guide and through the closed contour as a result of the actuation of the motor 126 and then to retrieve the slide by means of the motor 126' until it reaches the end of its travel in the guide 124' (the position illustrated by dashes in FIGS. 2 and 5 and denoted by 130a).

It can thus be seen that the suspension ring 132 will have moved to 132a, carrying the cable with it through the passage.

The cable can then come to rest by gravity in the groove of the pulley 13 suspended from the insulator 21 (FIG. 3), guided by the ramp 22 and retained on the pulley by the pawl 23.

How the device of the invention is used will now be explained.

If it is assumed, with the conventions of FIG. 2, that the cable is to be passed from left to right through the closed contour of the supporting structure, the procedure is to arrange the slide in the left-hand guide 124 (the position illustrated by unbroken lines in FIG. 2).

The helicopter pilot then fits the device 100 of the invention over the supporting structure (the position illustrated in FIGS. 2 to 5).

He subsequently actuates the motor 126, thus allowing the slide to pass through the supporting structure and rejoin the opposite guide tube 124', where the second motor 126' takes over the translational movement and pushes the slide 130 to the end of its travel (the position illustrated by dashes in FIG. 2 and designated by 130a).

The cable, attached to the ring 132 of the slide, has thus passed through the supporting structure.

The helicopter can then lift the device 100 and continue unwinding it as far as the next pylon. The cable will then slide automatically through the groove of the pulley.

After the helicopter has lifted the device 1100 and before fitting it over the next pylon, care will be taken to return the slide (to which the wire is still attached) to the original position.

I claim:

1. A handling device (100) for laying electric cables by helicopter, making it possible to pass a cable through a passage in a supporting structure delimited by a closed contour (18, 19, 20) and having a horizontal crossmember (20) and lateral arms (16, 17), which comprises:
   a frame (110) capable of being suspended under the helicopter and having means (112–117) for centering and supporting the device on said supporting structure, said means comprising a pair of flanges (113, 114) at the ends of a beam (111) for covering said lateral arms (16, 17) of said supporting structure, carrier rollers (112) for centering said frame (110) on said supporting structure, and guide plates (117) for transverse centering;
   supported by this frame, two aligned straight guides (124, 124') located at a distance from one another on either side of said supporting structure and oriented in such a way that their common axis passes through the passage of said supporting structure;
   a slide (130) movable in translational motion through said straight guides, of a length greater than the gap between these and equipped with means (132) for fastening the end of said cable to it;
   drive means (125, 125') for moving the slide completely from one guide (124) to the other (124') and retrieving it in this other guide, at the same time carrying said cable across the gap between said guides so as to cause it to pass through said passage.

* * * * *

UNITED STATES PATENT AND TRADEMARK OFFICE
CERTIFICATE OF CORRECTION

PATENT NO. : 5,039,064
DATED : 8/13/91
INVENTOR(S) : Feuvrier

It is certified that error in the above-identified patent and that said Letters Patent is hereby corrected as shown below:

col. 04, line 22     after "position."     insert --As can be seen, there has been no human intervention either on the support or on the cable.--

Signed and Sealed this

Second Day of February, 1993

*Attest:*

STEPHEN G. KUNIN

*Attesting Officer*     Acting Commissioner of Patents and Trademarks